(12) United States Patent
Cho et al.

(10) Patent No.: US 10,896,202 B2
(45) Date of Patent: Jan. 19, 2021

(54) SCALABLE AND EFFICIENT EPISODIC MEMORY IN COGNITIVE PROCESSING FOR AUTOMATED SYSTEMS

(71) Applicant: HRL Laboratories, LLC, Malibu, CA (US)

(72) Inventors: Youngkwan Cho, Los Angeles, CA (US); Hyukseong Kwon, Thousand Oaks, CA (US); Rajan Bhattacharyya, Sherman Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 419 days.

(21) Appl. No.: 15/880,225

(22) Filed: Jan. 25, 2018

(65) Prior Publication Data

US 2018/0210939 A1   Jul. 26, 2018

Related U.S. Application Data

(60) Provisional application No. 62/450,751, filed on Jan. 26, 2017.

(51) Int. Cl.
| | |
|---|---|
| *G06F 16/13* | (2019.01) |
| *G06N 5/02* | (2006.01) |
| *G06N 20/00* | (2019.01) |
| *G06F 16/28* | (2019.01) |
| *G06N 3/08* | (2006.01) |
| *G06F 16/2458* | (2019.01) |

(52) U.S. Cl.
CPC ............ *G06F 16/28* (2019.01); *G06F 16/137* (2019.01); *G06F 16/2477* (2019.01); *G06N 3/082* (2013.01); *G06N 5/022* (2013.01); *G06N 20/00* (2019.01)

(58) Field of Classification Search
CPC .... G06F 16/28; G06F 16/137; G06F 16/2477; G06N 5/022; G06N 20/00; G06N 3/082
See application file for complete search history.

(56) References Cited

U.S. PATENT DOCUMENTS

| | | |
|---|---|---|
| 2008/0208915 A1 | 8/2008 | George et al. |
| 2015/0278688 A1 | 10/2015 | Miao et al. |

OTHER PUBLICATIONS

Nuxoll, Andrew M., and John E. Laird. "Extending cognitive architecture with episodic memory." Jul. 2007, In AAAI. (pp. 1560-1564). (Year: 2007).*

(Continued)

*Primary Examiner* — Thomas G Black
*Assistant Examiner* — Ana D Thomas
(74) *Attorney, Agent, or Firm* — Tope-McKay & Associates

(57) ABSTRACT

Described is a system for an episodic memory used by an automated platform. The system acquires data from an episodic memory that comprises an event database, an event-sequence graph, and an episode list. Using the event-sequence graph, the system identifies a closest node to a current environment for the automated platform. Based on the closest node and using a hash function or key based on the hash function, the system retrieves from the event database an episode that corresponds to the closest node, the episode including a sequence of events. Behavior of the automated platform in the current environment is guided based on the data from the episodic memory.

22 Claims, 4 Drawing Sheets

(56) References Cited

OTHER PUBLICATIONS

Vanderwerf, Emilia, et al. "Hash Functions for Episodic Recognition and Retrieval." Mar. 2016. The Twenty-Ninth International Flairs Conference. (pp. 116-121). (Year: 2016).*
Notification and International Preliminary Report on Patentability (Chapter I) for PCT/US2018/015284; dated Aug. 8, 2019.
Anderson, J. R., Bothell, D., Byrne, M. D., Douglass, S., Lebiere, C., & Qin, Y. An integrated theory of the mind. Psychological Review, 111(4), pp. 1036-1060, 2004.
Nuxoll, A. M., Laird, J. E. AAAI '07 Proceedings of the 22nd national conference on artificial intelligence—vol. 2, 1560-1565, 2007.
Laird, J. E., Newell, A., & Rosenbloom, P. S. SOAR: An architecture for general intelligence. Artificial Intelligence, 33(1), pp. 1-64, 1987.
Langley, P., & Cummings, K. (2004). Hierarchical skills and cognitive architectures. In in Proc. 26th Annual Meeting of the Cognitive Science Society, pp. 779-784, 2004.
Nuxoll, A. & Laird, J., "A cognitive model of episodic memory integrated with a general cognitive architecture," International Conference on Cognitive Modeling, 2004, pp. 1-6.
Nuxoll, A., Laird, J., James, M., "Comprehensive working memory activation in Soar," International Conference on Cognitive Modeling, 2004, pp. 226-230.
Tulving, E. Elements of Episodic Memory. Oxford: Clarendon Press, Chapter 7, 1983.
Winkler, J., Tenorth, M., Bozcuoglu, A. K., & Beetz, M. CRAMm—Memories for robots performing everyday manipulation activities. Advances in Cognitive Systems, 3, 2014, pp. 91-108.
Lew, M. S., Sebe, N., Djerba, C., & Jain, R. Content-based multimedia information retrieval: state of the art and challenges. ACM Transactions on Multimedia Computing, Communications, and Applications (TOMM), 2(1): pp. 1-19, 2006.
Notification of Transmittal of International Search Report and the Written Opinion of the International Searching Authority for PCT/US2018/015284; dated May 31, 2018.
International Search Report of the International Searching Authority for PCT/US2018/015284; dated May 31, 2018.
Written Opinion of the International Searching Authority for PCT/US2018/015284; dated May 31, 2018.
Nuxoll, A., et al., "Extending cognitive architecture with episodic memory," Proceedings of the 22nd national conference on artificial intelligence (AAAI '07), Jul. 22-26, 2007, vol. 2, pp. 1560-1565.
Vanderwerf, E., et al., "Hash functions for episodic recognition and retrieval," Proceedings to the Twenty-Ninth International FLAIRS Conference, 2016, pp. 116-121.
Nuxoll, A., et al., "A cognitive model of episodic memory integrated with a general cognitive architecture," Proceedings of the Sixth International Conference on Cognitive Modeling, ICCM 2004, Jul. 30-Aug. 1, 2004, pp. 220-225.
Communication pursuant to Rules 70(2) and 70a(2) EPC (the extended European Search Report which comprises the supplementary European Search Report and non-binding European Search Opinion) for the European Regional Phase Patent Application No. 18744687.7, dated Oct. 22, 2020.
Andrew M. Nuxoll: "Enhancing intelligent agents with episodic memory", Cognitive Systems Research, Jan 1, 2007 (Jan. 1, 2007), pp. 1-131, XP055733742, Retrieved from the Internet: URL:https:jjdeepblue.lib.umich.edujhandle/2027.42/57720?show=full [retrieved on Sep. 24, 2020].
Scott A Wallace et al: "Hashing for Lightweight Episodic Recall", AAAI Spring Symposium: Lifelong Machine Learning, Mar. 25, 2013 (Mar. 25, 2013), pp. 56-61, XP055733820, ISBN: 978-1-57735-602-8.

* cited by examiner

SCALABLE AND EFFICIENT EPISODIC MEMORY IN COGNITIVE PROCESSING FOR AUTOMATED SYSTEMS

CROSS-REFERENCE TO RELATED APPLICATIONS

This is a Non-Provisional patent application of U.S. Provisional Application No. 62/450,751, filed in the United States on Jan. 26, 2017, entitled, "Scalable and Efficient Episodic Memory in Cognitive Processing for Autonomous Systems," the entirety of which is hereby incorporated by reference.

BACKGROUND OF INVENTION

(1) Field of Invention

The present invention relates to a system for scalable and efficient episodic memory for an automated system and, more particularly, to a system for scalable and efficient episodic memory for automated systems that reduces the amount of required storage and access time to retrieve matching episodes.

(2) Description of Related Art

Content based retrieval systems are designed to store and recall information based on content as the retrieval cue (see Literature Reference No. 9 of the List of Incorporated Literatures References). However, prior content based retrieval systems have mainly focused on multimedia content, such as audio and video. In query based retrieval, a sample is directly provided to the system as a cue to be used for retrieval, and different matching algorithms are applied to the content. The prior art in content based retrieval systems uses features derived from the cue and information in the database to perform matching, as seen in the domains of image, video, and audio search.

Episodic memory has been investigated as a component in many cognitive architectures (see Literature Reference Nos. 1-8). Among them, Soar is a well-established architecture that includes models of working memory, procedural memory, and episodic memory. Soar stores the working memory elements (WMEs) into a tree structure in the working memory and stores the event sequence as a list of pointers to the corresponding WMEs in each episode. To retrieve matching episodes with a given cue, Soar searches the working memory tree for each element in the cue, collects all episodes that have at least one element in the cue, and finds the best matching episode. Searching an element in a tree takes O(n) time, where n is the number of elements in the tree. When a balanced binary tree is used, it is reduced to O(log n) time, but Soar does not use a balanced binary tree and tree-search is not efficient. Each episode maintains its own element list. To find the best matching episode, the cue is compared with every candidate episode even if there are many similar episodes in the candidate list. Soar does not take any advantages when there are many similar episodes.

Thus, a continuing need exists for a system that reduces the amount of required storage to store episodes and the access time to retrieve matching episodes with a requested cue for a scalable and efficient episodic memory.

SUMMARY OF INVENTION

The present invention relates to a system for scalable and efficient episodic memory for an automated system and, more particularly, to a system for scalable and efficient episodic memory for an automated system that reduces the amount of required storage and access time to retrieve matching episodes. The system comprises one or more processors and a non-transitory computer-readable medium having executable instructions encoded thereon such that when executed, the one or more processors perform multiple operations. The system acquires data from an episodic memory that comprises an event database, an event-sequence graph, and an episode list. Using the event-sequence graph, the system identifies a closest node to a current environment for the automated platform. Based on the closest node and using a hash function or key based on the hash function, the system retrieves from the event database an episode that corresponds to the closest node, the episode including a sequence of events. Behavior of the automated platform in the current environment is guided based on the data from the episodic memory.

In another aspect, when a new episode stored in the episodic memory is similar enough to an existing episode in the episodic memory, then the new episode is discarded to save storage, the similarity being determined by a similarity rating and a similarity rating threshold.

In another aspect, when episodes have common events, the episodes share nodes in the event-sequence graph.

In another aspect, each event in the stored episodes has a corresponding node in the event-sequence graph, and each node has a pointer pointing to a corresponding event in the event database.

In another aspect, the corresponding event in the event database is directly accessible from each node in the event-sequence graph, and from an event in the event database, it is determined which nodes in the event-sequence graph share the event.

In another aspect, the data that is retrieved comprises observations which are a match to a currently observed spatiotemporal sequence of objects in the current environment.

In another aspect, for each event in a new episode that comes into the episodic memory, if there is an existing event in the event database that is the same or similar to the event in the new episode, then the existing event is used, otherwise, the event in the new episode is stored in the event database.

In another aspect, the hash function is used to store episodes in the event database.

In another aspect, the hash function maps a hash key directly to the corresponding event to reduce a number of comparisons needed for finding the matching event.

In another aspect, the behavior of the automated platform is guided to correspond with the sequence of events in the retrieved episode.

In another aspect, the behavior of the automated platform is guided to avoid the sequence of events in the retrieved episode.

In another aspect, guiding the automated platform includes at least one of steering, accelerating, and braking.

In another aspect, acquiring data further comprises generating a list of events from the episode that corresponds to the closest node, and the data includes the list of events.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
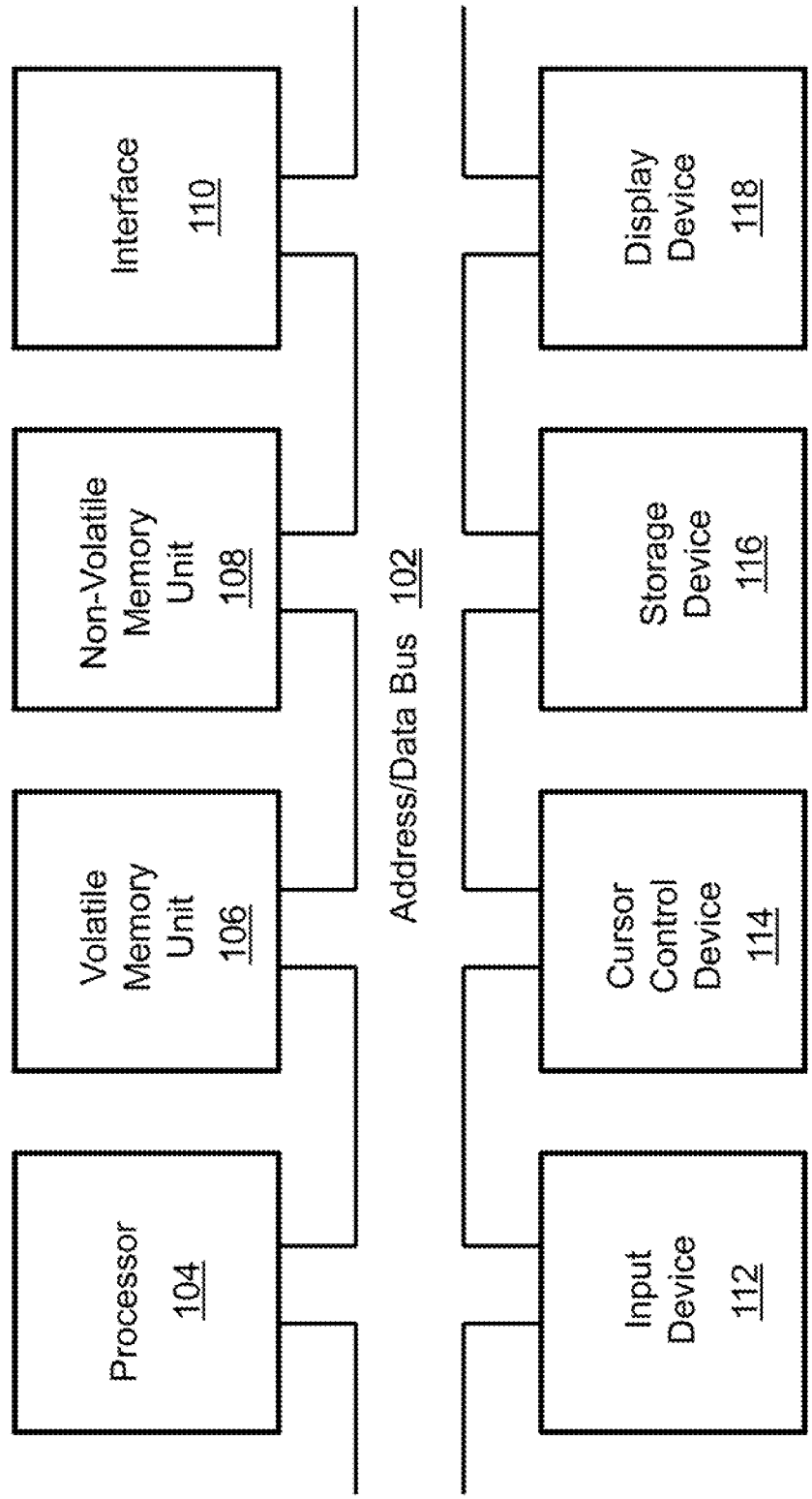
FIG. 1 is a block diagram depicting the components of a system for scalable and efficient episodic memory according to some embodiments of the present disclosure.

The present invention relates to a system for scalable and efficient episodic memory for an automated system and, more particularly, to a system for scalable and efficient episodic memory for automated systems that reduces the amount of required storage and access time to retrieve matching episodes. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Anderson, J. R., Bothell, D., Byrne, M. D., Douglass, S., Lebiere, C., & Qin, Y. An integrated theory of the mind. Psychological Review, 111(4), 1036-1060, 2004.
2. Nuxoll, A. M., Laird, J. E. AAAI '07 Proceedings of the 22nd national conference on artificial intelligence—Volume 2, 1560-1565, 2007.
3. Laird, J. E., Newell, A., & Rosenbloom, P. S. SOAR: An architecture for general intelligence. Artificial Intelligence, 33(1), 1-64, 1987.
4. Langley, P., & Cummings, K. (2004). Hierarchical skills and cognitive architectures. In in Proc. $26^{th}$ Annual Meeting of the Cognitive Science Society, 779-784, 2004.
5. Nuxoll, A. & Laird, J. A cognitive model of episodic memory integrated with a general cognitive architecture. International Conference on Cognitive Modeling, 2004.
6. Nuxoll, A., Laird, J., James, M. Comprehensive working memory activation in Soar. International Conference on Cognitive Modeling, 2004.
7. Tulving, E. Elements of Episodic Memory. Oxford: Clarendon Press, Chapter 7, 1983.
8. Winkler, J., Tenorth, M., Bozcuoglu, A. K., & Beetz, M. CRAMm—Memories for robots performing everyday manipulation activities. Advances in Cognitive Systems, 3, 2014.
9. Lew, M. S., Sebe, N., Djerba, C., & Jain, R. Content-based multimedia information retrieval: state of the art and challenges. ACM Transactions on Multimedia Computing, Communications, and Applications (TOMM),

(2) Principal Aspects

Various embodiments of the invention include three "principal" aspects. The first is a system for scalable and efficient episodic memory. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions fob the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
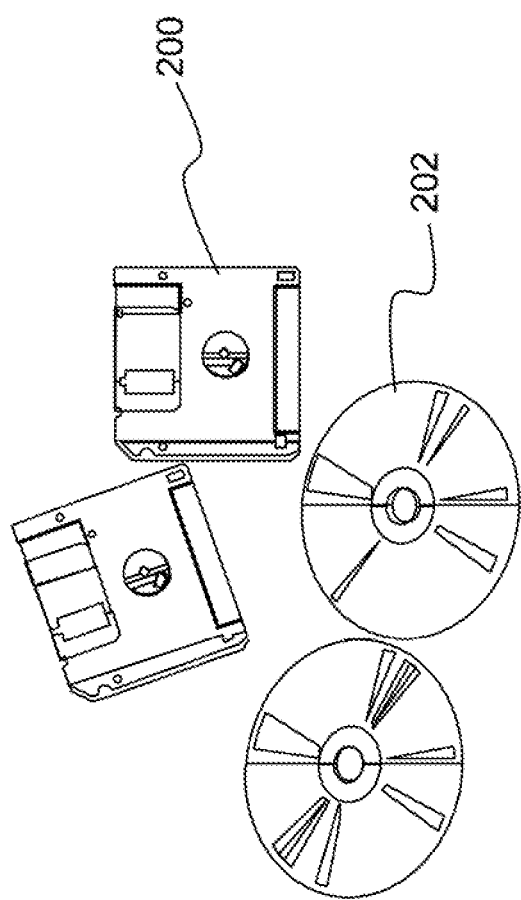
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described are a scalable episodic memory architecture and efficient access methods to store and retrieve episodes in an episodic memory. An episode is a sequence of events that describe situations in an application domain. The actual content of each event depends on what needs to be dealt with and the application domain as well. For example, in the automated driving domain, each event might be an arrangement of perceived objects around the self-vehicle at a specific time. The objects might include vehicles, motorcycles, pedestrians, road signs, traffic lights, and traffic islands. Furthermore, in the intelligence, surveillance, and reconnaissance (ISR) domain, events may include information from multiple sources as geospatial locations and times of objects, people, activities, signals intelligence. The system described herein reduces the amount of required storage to store episodes and the access time to retrieve matching episodes with a requested cue for a scalable and efficient episodic memory, thereby dramatically improving the computer system itself. In order to achieve this, the invention may comprise one or more of multiple unique components.

First, a collective event database may be maintained in the episodic memory. All events of the stored episodes are separated from their episodes and put into the common event database. Each episode keeps a list of pointers pointing to its events in the database. When multiple episodes have a common event in their event sequences, only one event is stored in the database, and it is shared by the episodes instead of keeping their own instances of the event in themselves. Additionally, if an event occurs several times in an episode, only one event is stored in the database and the episode keeps multiple pointers to the event instead of keeping multiple instances of the same event in itself.

Second, a hash function may be adopted to access the event database in the episodic memory. A set of a hash key and hash function reduces search time of a requested event in the database to O(1) to store or retrieve the event.

Third, the event sequences of the episodes may be stored in a common graph structure. In some embodiments, a graph is a structure amounting to a set of objects in which some pairs of the objects are in some sense "related". The objects correspond to mathematical abstractions called nodes (also called vertices or points) and each of the related pairs of nodes is called an edge (also called an arc or line). Typically, a graph may be depicted in diagrammatic form as a set of dots for the vertices, joined by lines or curves for the edges. Graphs are one of the objects of study in discrete mathematics.

When a new episode is added into the episodic memory, the closest stored episode is retrieved. If they are close enough (e.g., a similarity measure or rating is less than or greater than a measure or rating threshold), a mechanism is used where the new episode shares the same nodes in the path of the existing episode and adds alternative routes to the path whenever its sub-sequence (i.e., small part or segment of a sequence) does not match with that of the existing episodes. This node sharing mechanism in the graph structure reduces the required storage and also facilitates the matching process, because comparing with the shared nodes has the same effect of comparing with the multiple episodes sharing the nodes. These three components make a scalable and efficient episodic memory possible.

The system according to embodiments of the present disclosure provides a capability to store and recall spatiotemporal sequences of information relevant to automated systems to guide their behavior. Instead of addressing memory directly, the cue to perform a recall is information content of the same domain as is stored. As can be appreciated by those skilled in the art, the process described herein dramatically improves the performance of the computer system itself and, as a result, improves the associated systems relying thereon. Further details are provided below.

(3.1) Approach

A hippocampal-like episodic memory in an intelligent cognitive system needs to be able to store and recall spatio-temporal sequences of data fast and efficiently. In addition to basic store and recall, the episodic memory system needs to be able to make partial matches. Due to the potential complexity of spatio-temporal data streams, it is unlikely that different episodes will exactly match. There is, consequently, a need to do approximate matching returning a distance or similarity measure so various episodes can be ranked according to degree of match or applicability. In addition, as the system will be used to generate expectations, it will also need to perform partial prefix matches where the episodic suffix will represent an expectation. Finally, as one wants to store as many episodes as possible, some form of compression or common subsequence recognition is necessary to reduce or eliminate duplicated stores of common subsequences, which may appear in different episodes. The system described herein is designed to be domain agnostic. Some of the possible instances of this spatio-temporal sequence data are the data sensed by an automated vehicle and ISR (intelligence, surveillance, reconnaissance) data sensed by a UAV (unmanned aerial vehicle) or some geospatial analysist system.

(3.2) Data Structure

The episodic memory system has four layers (or levels) of data structures. These are called an element layer, an event layer, an episode layer, and an episodic memory layer.

(3.2.1) Element

The lowest level is the element. Elements are indivisible things, or facts, describing the environments or the situation at a specific time, and they are different depending on the application domain. In the automated driving domain, elements could be things affecting driving, such as vehicles, bicycles, persons, obstacles, traffic signs, traffic lights, traffic officers, lane markers, and road structures. Elements could have descriptions (attributes and values) about themselves at a specific time. While stationary elements may have static descriptions, such as speed limit sign and lane markers, dynamic elements may have temporally changing descriptions, such as moving objects and traffic lights.

The primary method for the element layer is the comparison of two elements. The comparison returns distance (or similarity) between two elements—a measure of how far (or similar) two elements are to each other. When the elements are in different types, they are different, such as a vehicle versus a person, a bicycle versus a traffic sign, and so on. The comparison should apply different appropriate measures for different element types. If the elements have multiple levels of abstraction, the comparison may consider the level of details as well, if necessary. For example, "vehicle" could be a top level abstraction of a trailer, truck, bus, sedan, van, or motorcycle. "Person" might be divided into adult and child in the detailed level.

(3.2.2) Event

An event is a collection of the elements that describe the situation at a specific time. An event may have information about the spatial arrangements of the elements as well. An event in the automated driving domain will include a representation of the spatial arrangement of the elements that the automated system senses at a specific time. The elements are described using an ego-centric perspective. However, a geo-centric perspective is also used where a multi-way observation is required, such as an intersection.

The primary method for the event layer is also the comparison of two events. The comparison returns distance (or similarity)—a measure of how far (or similar) two events are to each other. The comparison collects the element-wise comparison results of the event components and analyzes them. If an event has multiple levels of abstraction, the comparison may consider the level of details as well. When event A and event B are compared in this embodiment, simple set metrics are:

Similarity metric=$|A \cap B|/|A \cup B|$

Distance metric=$\max\{|A|,|B|\}-|A \cap B|$, where $A \cap B$ is an intersection (the same or similar elements) of A and B, $A \cup B$ is a union (all different elements) of A and B, and $|A|$ is the number of elements in A. If the importance of each element type is different, a weighted metric would be preferable. Other embodiments may include weighting functions on specific element types for the metric, and other metrics.

(3.2.3) Episode

An episode is a sequence of events chained together in a temporal ordering. One of the difficulties with respect to episodes is deciding where they begin and where they end. Depending on the application domain, different criteria or methods might be applied. In the automated driving domain, the entire driving sequence from the starting location to the destination could be thought of as one episode. An alternative method is using each item in the turn list generated by a navigation system as an episode, and the whole trip is a collection of short-term episodes.

The primary method for episodes is the comparison of two episodes, as with events. An episode is a temporally ordered event sequence. If the comparison is to check if the two episodes are the same or not, it is simple; check if the numbers of the events are the same and check if the corresponding events are the same in the event sequences. If the comparison is to measure distance (or similarity) between two episodes, the event sequences in the episodes should be properly aligned to each other and the correspondences between events should be determined first. Then, distances between the corresponding event pairs are collected and summarized to the final result. If there are any noncorresponding (missing or extra) events in the episodes, penalties might be applied for noncorresponding events. This is central to recall matching episodes with a partial cue. The system described herein adopts spatial-temporal generalizations of bioinformatics sequence alignment algorithms.

(3.2.4) Episodic Memory Layer

Episodic memory represents the complete knowledge set of 'remembered' episodes. The episodic memory should have the following functionalities: storing episodes, deleting obsolete episodes, recalling existing episodes, and completing a partial cue to existing episodes. Just listing all the episodes will be inefficient from both of a memory storage point of view and from an algorithmic point of view. The episodes should be stored efficiently in the view of memory size and memory search as well. Episodic memory keeps events and episodes separately. Episodic memory also creates an event-sequence graph to capture the similarities between the stored episodes.

(3.3) Architecture

Figure 3:
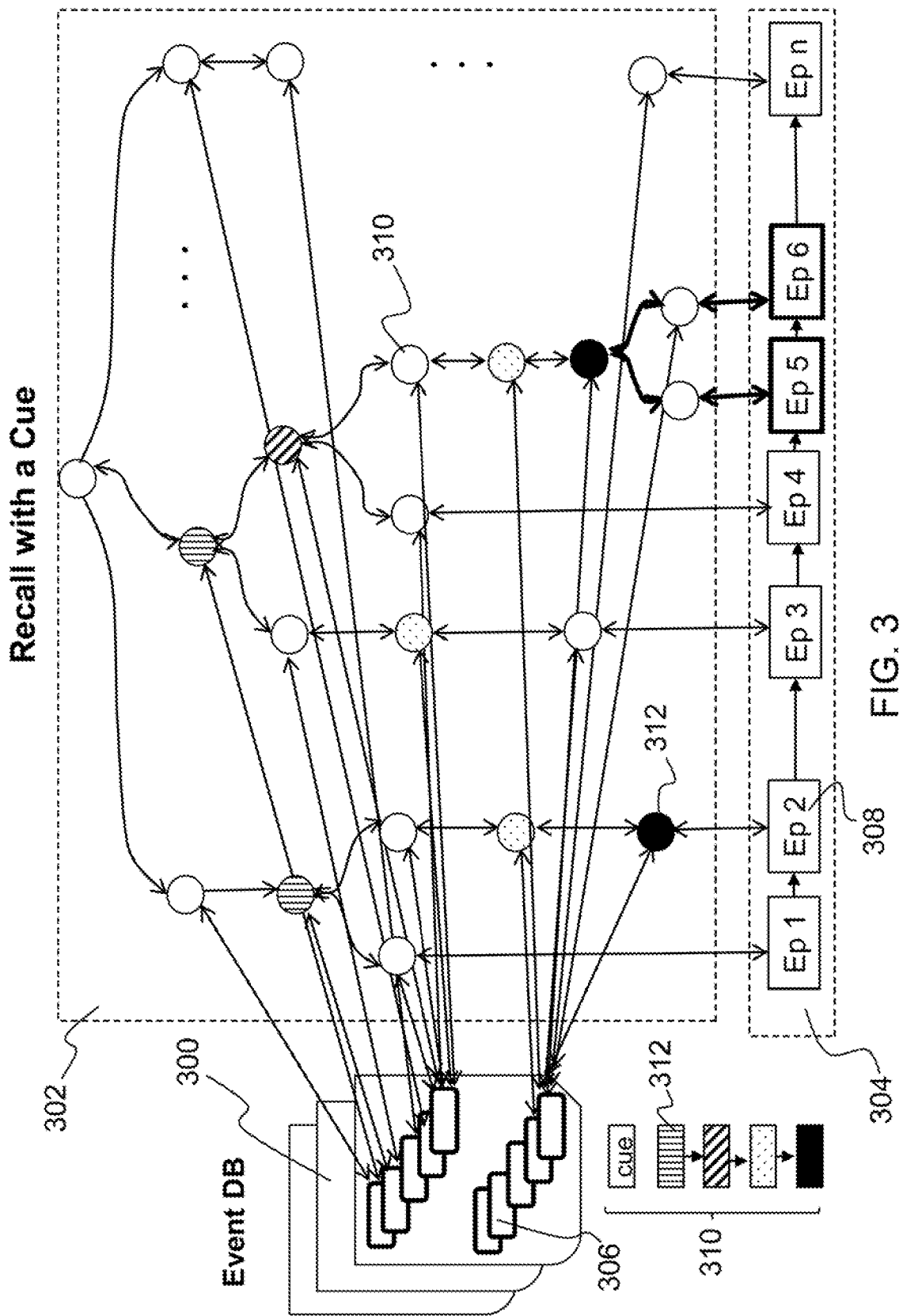
FIG. 3 is an illustration of episodic memory recall according to some embodiments of the present disclosure.

As depicted in FIG. 3, episodic memory is composed of three major parts: an event database 300, an event-sequence graph 302, and an episode list 304.

(3.3.1) Event Database (Element 300)

All events (e.g., 306) of the episodes 308 in the episodic memory are collected and stored in the event database 300 using a hash function. The hash function should use key elements in the event structure and should distribute the events 306 as evenly in the buckets in the event database 300 as possible for efficient event search. A good hash function and hash key depend on the content of events 306 and application domains as well. As a new episode 308 comes into the episodic memory, for each event 306 in the episode, the event database 300 is searched to check if the same or similar event 306 is already in there. If the same or similar event 306 is found in the event database 300, the existing event 306 will be used; otherwise, the new event 306 will be stored into the event database 300. Instead of storing all events, reusing the existing events 306 could save the memory space and speed up the searching process. This will also help the scalability of the episodic memory. The criteria of the same or similar event depend on the application domain and the levels of abstraction in the event structure.

(3.3.2) Event-Sequence Graph (Element 302)

An event-sequence graph 302 is a directed graph whose nodes (e.g., 310) represent the events in the stored episodes. Each path (represented by a series of nodes connected by arrows) in the event-sequence graph 302 may show the event sequence of some stored episode(s). Multiple episodes 308 might be similar to each other; for example, when multiple episodes have most of their event sequences the same and small number of events different. The multiple similar episodes could share the same main path in the event-sequence graph 302. Each episode forks a short alternative route at the starting of each noncorresponding subsequence and joins to the main path at the end of the noncorresponding subsequence. Therefore, the event-sequence graph 302 captures these similarities between episodes 308 and facilitates searching episodes with a cue 310, because comparing the cue 310 with a shared path has the same effect of comparing the cue 310 with the multiple episodes 308 sharing the path.

Each event 306 in the stored episodes in the event-sequence graph 302 has a corresponding node (e.g., 310) in the event-sequence graph 302, and each node (e.g., 310) has a pointer pointing to the corresponding event 306 in the event database 300. The event 306 in the event database 300 also keeps a pointer pointing back to the corresponding node (e.g., 310), allowing for accessing each other directly. The two-sided pointing between nodes (e.g., 310) and events (e.g., 306) is indicated in FIG. 3 as double-sided arrows. When multiple nodes share the same event in the event database 300, the all nodes point to the same event, and the event keeps a list of pointers pointing back to the multiple nodes. "All nodes" refers to multiple nodes sharing the same event. Therefore, from a node (e.g., 310), the corresponding event (e.g., 306) in the event database 300 can be directly accessed and, similarly, from an event (e.g., 306) in the event database 300, one can tell which nodes (e.g., 310) in the event-sequence graph 302 share the event. The node (e.g., 312) representing the last event of each stored episode has a pointer to the corresponding episode (e.g., 308). When the event sequences of multiple episodes end at the same node, the node keeps a list of pointers pointing to the multiple episodes. At an end node of a path (e.g., 312), these pointers can tell which episodes might be matching with the path.

(3.3.3) Episode List (Element 304)

An episode list 304 stores all episodes in the episodic memory. The event sequence in each stored episode is replaced with a list of pointers pointing to the corresponding nodes in the event-sequence graph. The all events (e.g., 306) in an episode (e.g., 308) can be accessed indirectly through the pointers to the corresponding nodes (e.g., 308). The "all events" refers to all events in the even sequence in an episode. When a new episode is stored into the episode list 304, the episode list 304 is checked if there is the same episode (e.g., 308). If the same episode is found, the counter in the existing episode is increased, and the new episode is discarded to save the storage. Each episode in the episode list has a counter of occurrence in the training episode data set. If all episodes are unique in the data set, the counters are all 1. If an episode is repeated twice in the data set, the counter of the episode will be 2 instead of storing the same episode twice.

(3.4) Methods

The event sequence in an episode (e.g., 308) has a temporal order. The input cue 310 for searching the episodes (e.g., 308) in the episodic memory could be a complete episode or an incomplete partial subsequence, as depicted in FIG. 3. A complete episode cue could be used for inserting a new episode and deleting an obsolete episode. With a cue (e.g., 310, a segment of a whole event sequence) from a live input stream, a system could predict future based on the suffix(es) of the matching episodes. With a partial suffix cue, the system could collect all pre-conditions ended up to the resulting partial cue based on the prefixes of the matching episodes. The invention described herein uses a version of the sequence alignment algorithm from bioinformatics. This algorithm as used in bioinformatics takes a DNA or protein sequence and finds the best match in a large database of sequences. In a similar way, it will find the best matches within episodic memory using the event-sequence graph 302 and align the cue 310 with it if they are not the same.

A brief description of recalling the best matching episodes (e.g., 308) with a cue 310 is the following.

(1) For each event (represented by a separate patterned rectangle (e.g., 312)) in the cue 310, the same or similar events in the event database 300 are searched with the hash function. Each found event (e.g., 306) in the event database 300 has a list of pointers (represented by arrows) to all related nodes (e.g., 310) in the event-sequence graph 302. If the found event (e.g., 306) is the same as the event (e.g., 312) in the cue 310, their matching cost is zero. If they are similar, their matching cost is the distance measure between them. Distance is a concept of dissimilarity between two events. The calculation method depends on the specific application. If the events are points in a XY plane or XYZ volume, Euclidian distance is the calculation method. Put all pairs of the event in the cue and each found node into a priority queue with their matching cost. Each queue entry is a candidate aligned sequence (event-path and the node-path) of length 1 between the cue and the matching episode(s). For the events except the first one in the cue, the prior event(s) are missing in the candidate episodes and missing penalties might be added to the cost as much as the number of prior event(s), if there is a missing penalty. The priority queue sorts the entries by their associated costs and keeps the smallest cost pair on the top, as follows:

```
for each e_i in CUE                // CUE is the input cue
    (E, D) <- hash(E_DB, e_i)      // E_DB is the event database
                                    // E is the list of the found events
                                    // D is the list of distances between
                                    //    events in E and e_i
```

-continued

```
    p <- missing_penalty * i       // missing_penalty is the penalty
                                    //    of missing or extra event
    D <- D + p                     // add penalty to distance
    For each (e_j, d_j) in (E, D)
        For each n_k in node_list(e_j)  // node_list is the list of related
                                         //    nodes in the event in E_DB
            put (e_j, n_k, d_j) into priority_queue
```

(2) Until the priority queue is empty, test the top entry. If the last event in the event-path of the top entry is the last event in the cue, or the last node in the node-path of the top entry is a terminal node (i.e., no next node), the alignment is completed; so, move to step (3) below. Otherwise, delete the top entry, expand the aligned sequence and cost, and push the updated sequence and the associated cost into the priority queue. There are three possible expansions.

(a) The current aligned sequence is confirmed. Expand the aligned sequence to the next event in the cue and the next node in the event-sequence graph. If the new node is in the list of the related nodes of the new event, the matching cost of them is added to the current cost. If not found, the event and the node are missing in the other's sequence, and twice of the missing penalty is added to the current cost.

(b) Assuming the last event in the current aligned sequence is missing in the episode, expand the sequence only to the next event in the cue. Subtract the matching cost between the last event and the last node from the current cost, and add one missing penalty and the matching cost between the new event and the last node to the current cost.

(c) Assuming the last node in the current aligned sequence is missing in the cue, expand the sequence only to the next node in the graph. Similarly, subtract the matching cost between the last event and the last node from the current cost and add one missing penalty and the matching cost between the last event and the new node to the current cost.

The following is an example of the three expansions.

```
while not empty(priority_queue)
    (e_path, n_path, cost) <- top(priority_queue)
    if last_event(e_path) == last_event(CUE)
        break
    if last_node(n_path) is a leaf
        break
    pop(priority_queue)
    // expand in both CUE and graph
    new_e_path <- expand(e_path)   // add the next event to the path
    new_n_path <- expand(n_path)   // add the next node to the, path
    new_cost <- cost + distance(last_event(new_e_path),
last_node(new_n_path))
    push (new_e_path, new_n_path, new_cost)into priority_queue
    // assume missing event and expand in CUE only
    new_cost <- cost − distance(last_event(e_path),
    last_node,(n_path))
    new_e_path <- expand(e_path)   // add the next event to the path
    new_cost <- new_cost + distance(last_event(new_e_path),
last_node(n_path))
    push (new_e_path, n_path, new_cost) into priority_queue
    // assume missing node and expand in graph only
    new_cost <- cost − distance(last_event(e_path),
    last_node(n_path))
    new_n_path <- expand(n_path)   // add the next node to the path
    new_cost <- new_cost + distance(last_event(e_path),
last_node(new_n_path))
    push (new_e_path, n_path, new_cost) into priority_queue
```

(3) If the priority queue is empty, there is no matching episode in the episodic memory with the cue. Because the top entry in the queue is one of the best matching aligned sequence, pop the top entry and put it into the candidate list. Until the queue is empty or the cost of the top entry is greater than the cost of the candidate, pop the top entry, and add it into the candidate list when the last event in the event-path is the last event in the cue or the last node in the node-path is a terminal node because the alignment is completed.

```
candidates <- NULL
if not empty(priority_queue)
    (e_path, n_path, cost) <- top(priority_queue)
    min_cost <- cost
    push n_path into candidates
    pop(priority_queue)
while not empty(priority_queue)
    (e_path, n_path, cost) <- top(priority_queue)
    if min_cost < cost
        break
    if last_event(e_path) == last_event(CUE)
        push n_path into candidates
    if last_node(n_path) is a leaf
        push n_path into candidates
    pop(priority_queue)
```

(4) The node-paths in the candidate list are the aligned parts of the corresponding episodes. When the cue is an incomplete episode, the aligned parts are the subsequences of the whole event sequences of the matching episodes. Since the last node of each episode has a pointer to the episode, traverse forward through the event-sequence graph from the last node in each node-path in the candidate list and collect all episodes pointed by nodes during the traverse, as follows:

```
matching_episodes <- NULL
for each n_path in candidates
    node <- last_node(n_path)
    while node is valid
        if episode( node ) is valid && n_path is
            sub_sequence( episode( node ) )
            push episode( node) into matching_episodes
        node <- next( node )
```

Two other primary methods for episodic memory are insert and delete. Insert is used to store a new episode into the episodic memory. For each event in the episode, the event database is looked up first with a hash function. If the event is found, the existing event is reused. If it is not found, the new event is stored into the database. With recall method, the best matching episode in the episodic memory is retrieved. If the best matching episode is the same as the new episode, the counter in the existing episode is increased. If no matching episode is found, then the sequence of nodes pointing to the corresponding events in the database is added into the event-sequence graph. From the start of the graph, the algorithm follows the path whose nodes point to the same events as the new inserted nodes point to and makes a new branch when the new node sequence digress from the path. The last new node will point the new episode, and the episode is added to the episode list. If a similar episode is found, the algorithm follows the path of the found episode and branches an alternative route when the events are different from the found episode and joins the main path when the events are the same. A pointer to the new episode in added to the episode list in the last node of the new episode.

Delete removes an obsolete episode. It retrieves the best matching episode in the episodic memory with recall method. If the same one is found, it follows the path in the graph and deletes the nodes and the corresponding events in the event database if they are not shared with any other episodes and then deletes the episode from the episode list.

In summary, the system and method according to embodiments of the present disclosure has multiple unique aspects. The collective hash-based event database 300 in the episodic memory reduces the amount of required storage to store episodes by sharing the same events (e.g., 306) between the episodes. All events (e.g., 306) in the episodic memory are separated from their episodes and put into the common event database 300 when they do not exist in the database. When the same events (e.g., 306) are found in the event database 300, the events (e.g., 306) are shared between episodes. Multiple episodes share the same events in the event database 300 instead of keeping their own instances in themselves. In addition, if an event (e.g., 306) occurs several times in an episode, the episode shares the same event in the database instead of keeping the same multiple instances in itself. Therefore, all events in the event database 300 are distinct, and the amount of required storage to store the episodes can be reduced.

Further, a hash function can facilitate accessing events in the hash-based event database 300. A good hash function can map a hash key directly to the corresponding event (e.g., 306) or to a few candidate events to reduce the required number of comparisons until finding the matching event. For example, using the hash key as an index of an array of event buckets, each event bucket may have multiple events. Therefore, a good hash function could reduce the access time of the event database 300 to O(1) time.

Additionally, the common event-sequence graph 302 structure of the stored episodes (e.g., 308) reduces the retrieving time for the matching episodes with a partial cue 310. When multiple episodes (e.g., 308) have many common events in their sequences, they share the same main path in the event-sequence graph 302 with some short alternative routes for their different event segments. These shared nodes represent events in multiple episodes. Comparing the events in the cue 310 (represented as various patterned rectangles) with the shared nodes has the same effect of comparing the cue with the multiple episodes sharing the nodes. This system described herein makes an episodic memory scalable and efficient by reducing storage requirement and processing time.

Figure 4:
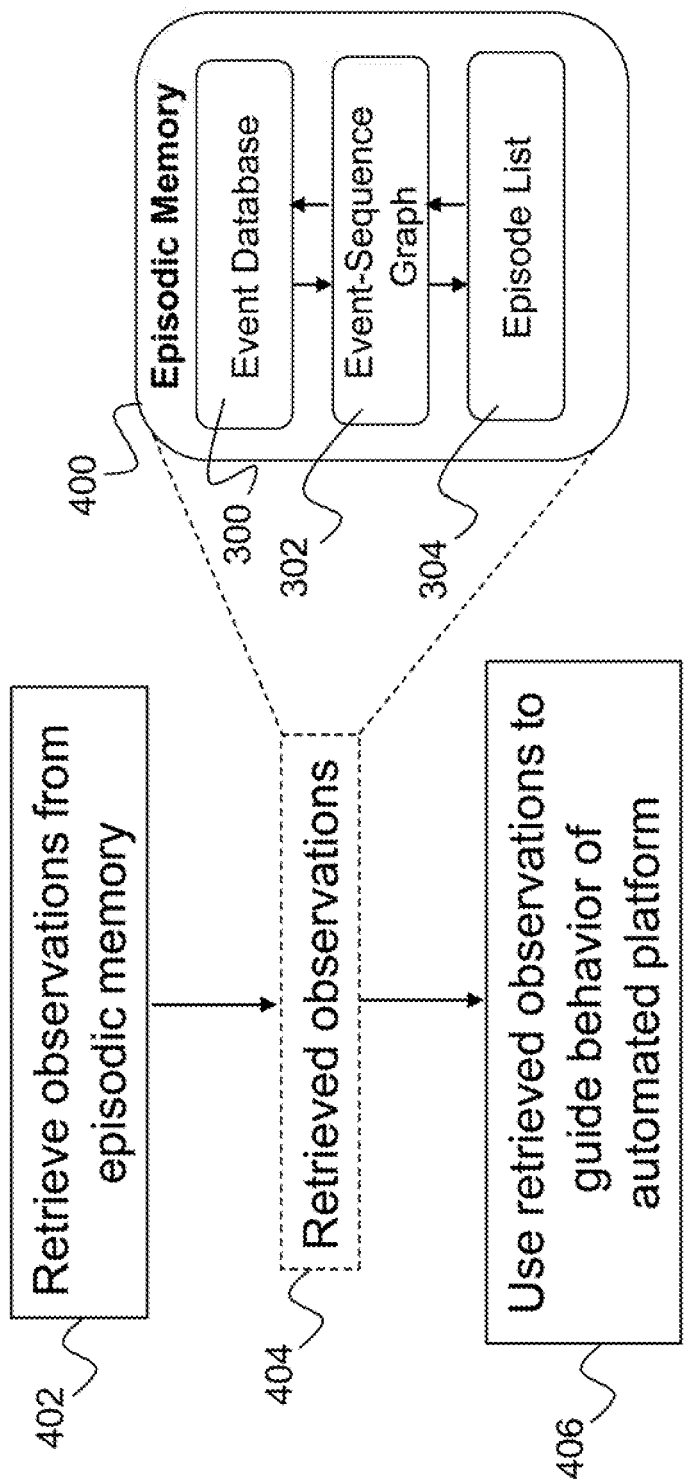
FIG. 4 is a flow diagram illustrating the process of content retrieval from the episodic memory according to some embodiments of the present disclosure.

In the invention described herein (and as depicted in FIG. 4), an episodic memory 400 was designed that performs content based retrieval (i.e., retrieve observations from episodic memory 402) using higher level information provided by perceptual systems (commonly found in automated mobile platforms and robotic platforms that employ object recognition). As described above, each episode is a sequence of events. The events are efficiently stored or retrieved in the event database using a hash function. The repeated episodes are discarded but the number of occurrence is recorded in the stored episode.

The episodic memory 400 approach to content based retrieval according to embodiments of the present disclosure is tailored such that the retrieved observations 404 are used for application to automated systems to guide behavior (element 406) by directly performing retrieval of observations (element 402) from the episodic memory 400 which are a match to the currently observed spatiotemporal sequence of objects in a scene. Non-limiting examples of sensors that could be used to obtain observations of objects in a scene include cameras and/or distance measuring devices using, for instance, ultra-sound or laser. Matching is performed on this information directly instead of computed features. As described above, the episodic memory 400 according to embodiments of the present disclosure comprises an event database 300, an event-sequence graph 302, and episode list 304, which interact for a scalable and efficient episodic memory 400 system.

An episodic memory 400 is a critical component of a cognitive architecture in a variety of applications. Information processing for automated systems, whether on mobile platforms or ground-based infrastructure platforms, can benefit from using an efficient episodic memory 400 as a content based retrieval system. Therefore, the system and method described herein is applicable to any area adapting an intelligent learning system. One example application is an intelligent autonomous control. By applying the method described herein to autonomous driving, the system can learn to respond to situations in an area/environment surrounding the automated vehicle, retrieve the appropriate stored knowledge quickly, and resolve any problems, if any, in a timely manner. For example, in the autonomous driving domain, each event might be an arrangement of perceived objects around the self-vehicle at a specific time. The objects might include vehicles, motorcycles, pedestrians, road signs, traffic lights, and traffic islands. Based on past data of these objects from an episodic memory, the system can guide behavior of the automated vehicle. The automated platform may be fully autonomous, or it may be controlled fully or in part by a person. For example, the person may be present in the vehicle or remotely operating the vehicle. Non-limiting examples of guided behavior include stopping for pedestrians, stopping at stop signs or traffic lights, inducing acceleration of the vehicle when a traffic light indicates a "go" signal, and re-routing the path to avoid another vehicle, pedestrian, traffic cone, or other obstacle.

Furthermore, the system can also be used in intelligent control of manned or unmanned aircraft systems and analysis of acquired information. In the intelligence, surveillance, and reconnaissance (ISR) domain, events may include information from multiple sources as geospatial locations and times of objects, people, activities, signals intelligence. An unmanned aerial vehicle (UAV) can be caused to travel to a specific location/position based on past data of geospatial coordinates, or detect and classify a specific object of interest and travel towards the specific object in order to obtain visual recordings of the object.

In some embodiments, a vehicle system tries to find the closest event in the graph with the current traffic/environmental situation (e.g., a similar stop sign location along with similar neighborhood vehicle locations, similar arrangements of other vehicles and/or pedestrians in the environment). The system does not look for an individual object. The system may further perform one or more of the following:

(1) Find the closest event in the event sequence graph with the current traffic situation around the host vehicle.

(2) List the following (or predicted) events from the found event in the graph.

(3) Determine and apply vehicle control inputs (steering, braking, and/or engine-based acceleration) to achieve host vehicle locations corresponding to the predicted events or that would avoid host vehicle locations corresponding to the predicted events. For example, the predicted events may include successfully stopping at a stop sign or navigating a turn, and the system could guide a vehicle to mimic the successful events. The predicted events may also include a collision with another vehicle, person, or object, and the system could then guide a vehicle to avoid or otherwise reduce the severity of the events.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for episodic memory for an automated platform, the system comprising:
one or more processors and a non-transitory computer-readable medium having executable instructions encoded thereon such that when executed, the one or more processors perform operations of:
acquiring data from an episodic memory that comprises an event database, an event-sequence graph, and an episode list, wherein acquiring data comprises:
using the event-sequence graph, identifying a closest node to a current environment for the automated platform;
based on the closest node and using a hash function, retrieving from the event database an episode that corresponds to the closest node, the episode including a sequence of events,
wherein the hash function maps a hash key directly to a corresponding event to reduce a number of comparisons needed for finding a matching event; and
guiding behavior of the automated platform in the current environment based on the data from the episodic memory.

2. The system as set forth in claim 1, wherein when a new episode stored in the episodic memory is similar enough to an existing episode in the episodic memory, then the new episode is discarded to save storage, the similarity being determined by a similarity rating and a similarity rating threshold.

3. The system as set forth in claim 1, wherein when episodes have common events, the episodes share nodes in the event-sequence graph.

4. The system as set forth in claim 1, wherein each event in the stored episodes has a corresponding node in the event-sequence graph, and each node has a pointer pointing to the corresponding event in the event database.

5. The system as set forth in claim 4, wherein the corresponding event in the event database is directly accessible from each node in the event-sequence graph, and from an event in the event database, it is determined which nodes in the event-sequence graph share the event.

6. The system as set forth in claim 1, wherein the data that is retrieved comprises observations which are a match to a currently observed spatiotemporal sequence of objects in the current environment.

7. The system as set forth in claim 1, wherein for each event in a new episode that comes into the episodic memory, if there is an existing event in the event database that is the same or similar to the event in the new episode, then the existing event is used, otherwise, the event in the new episode is stored in the event database.

8. The system as set forth in claim 1, wherein the hash function is used to store episodes in the event database.

9. The system as set forth in claim 1, wherein the behavior of the automated platform is guided to correspond with the sequence of events in the retrieved episode.

10. The system as set forth in claim 1, wherein the behavior of the automated platform is guided to avoid the sequence of events in the retrieved episode.

11. The system as set forth in claim 1, wherein guiding the automated platform includes at least one of steering, accelerating, and braking.

12. The system as set forth in claim 1, wherein acquiring data further comprises generating a list of events from the episode that corresponds to the closest node, and the data includes the list of events.

13. A computer implemented method for episodic memory for an automated platform, the method comprising an act of:
   causing one or more processors to execute instructions encoded on a non-transitory computer-readable medium, such that upon execution, the one or more processors perform operations of:
   acquiring data from an episodic memory that comprises an event database, an event-sequence graph, and an episode list, wherein acquiring data comprises:
   using the event-sequence graph, identifying a closest node to a current environment for the automated platform;
   based on the closest node and using a hash function, retrieving from the event database an episode that corresponds to the closest node, the episode including a sequence of events,
   wherein the hash function maps a hash key directly to a corresponding event to reduce a number of comparisons needed for finding a matching event; and
   guiding behavior of the automated platform in the current environment based on the data from the episodic memory.

14. The method as set forth in claim 13, wherein when episodes have common events, the episodes share nodes in the event-sequence graph.

15. The method as set forth in claim 13, wherein each event in the stored episodes has a corresponding node in the event-sequence graph, and each node has a pointer pointing to the corresponding event in the event database.

16. The method as set forth in claim 15, wherein the corresponding event in the event database is directly accessible from each node in the event-sequence graph, and from an event in the event database, it is determined which nodes in the event-sequence graph share the event.

17. The method as set forth in claim 13, wherein the data that is retrieved comprises observations which are a match to a currently observed spatiotemporal sequence of objects in the current environment.

18. The method as set forth in claim 13, wherein for each event in a new episode that comes into the episodic memory, if there is an existing event in the event database that is the same or similar to the event in the new episode, then the existing event is used, otherwise, the event in the new episode is stored in the event database.

19. The method as set forth in claim 13, wherein the hash function is used to store episodes in the event database.

20. A computer program product for episodic memory for an automated platform, the computer program product comprising:
   computer-readable instructions stored on a non-transitory computer-readable medium that are executable by a computer having one or more processors for causing the processor to perform operations of:
   acquiring data from an episodic memory that comprises an event database, an event-sequence graph, and an episode list, wherein acquiring data comprises:
   using the event-sequence graph, identifying a closest node to a current environment for the automated platform;
   based on the closest node and using a hash function, retrieving from the event database an episode that corresponds to the closest node, the episode including a sequence of events,
   wherein the hash function maps a hash key directly to a corresponding event to reduce a number of comparisons needed for finding a matching event; and
   guiding behavior of the automated platform in the current environment based on the data from the episodic memory.

21. The computer program product as set forth in claim 20, wherein each event in the stored episodes has a corresponding node in the event-sequence graph, and each node has a pointer pointing to the corresponding event in the event database.

22. The computer program product as set forth in claim 21, wherein the corresponding event in the event database is directly accessible from each node in the event-sequence graph, and from an event in the event database, it is determined which nodes in the event-sequence graph share the event.

* * * * *